US012592127B2

(12) United States Patent
Soong et al.

(10) Patent No.: US 12,592,127 B2
(45) Date of Patent: Mar. 31, 2026

(54) GAMING SYSTEM AND METHOD WITH A PERSISTENT ELEMENT FEATURE INCLUDING A SLIDING RANGE COMPONENT

(71) Applicant: LNW Gaming, Inc., Las Vegas, NV (US)

(72) Inventors: Kenneth Shawn Soong, Henderson, NV (US); John Kearns, Henderson, NV (US); Mariela Polena, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 401 days.

(21) Appl. No.: 18/065,682

(22) Filed: Dec. 14, 2022

(65) Prior Publication Data

US 2024/0203210 A1 Jun. 20, 2024

(51) Int. Cl.
*G07F 17/32* (2006.01)
*G07F 17/34* (2006.01)

(52) U.S. Cl.
CPC ...... *G07F 17/3262* (2013.01); *G07F 17/3211* (2013.01); *G07F 17/34* (2013.01)

(58) Field of Classification Search
CPC ... G07F 17/3262; G07F 17/3211; G07F 17/34
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
(Continued)

FOREIGN PATENT DOCUMENTS

AU 2013251288 A1 5/2014
AU 2014202042 A1 5/2014
(Continued)

OTHER PUBLICATIONS

"Rich Little Piggies—Hog Wild" Game Sheet, Copyright 2021 Scientific Games Corporation.

*Primary Examiner* — Jeffrey K Wong

(57) ABSTRACT

There are provided a gaming machine and method that utilize game-logic circuitry and a presentation assembly configured to present a plurality of symbol-bearing base reels, a base array, and a plurality of persistent elements. The plurality of base reels are spun and stopped to land symbols from the base reels in the base array. In response to the landed symbols including at least one accumulation symbol, an animation of addition of the accumulation symbol to one of the plurality of persistent elements is presented. A random determination whether or not to trigger one or more game features is made. If the determination is to trigger the one or more game features, the one or more game features are implemented via the game-logic circuitry and the presentation assembly, wherein the implementation may be determined by a persistent sliding range associated with at least one of the game features.

20 Claims, 7 Drawing Sheets

(56) References Cited

U.S. PATENT DOCUMENTS

| | | | | |
|---|---|---|---|---|
| 5,342,047 | A | 8/1994 | Heidel et al. | |
| 5,356,140 | A | 10/1994 | Dabrowski et al. | |
| 5,393,061 | A | 2/1995 | Manship et al. | |
| 5,395,111 | A | 3/1995 | Inoue | |
| 5,431,408 | A | 7/1995 | Adams | |
| 5,511,781 | A | 4/1996 | Wood et al. | |
| 5,618,232 | A | 4/1997 | Martin | |
| 5,695,188 | A | 12/1997 | Shibashi | |
| 5,704,835 | A | 1/1998 | Dietz | |
| 5,722,891 | A | 3/1998 | Inoue | |
| 5,752,881 | A | 5/1998 | Inoue | |
| 5,766,074 | A | 6/1998 | Cannon et al. | |
| 5,788,573 | A | 8/1998 | Baerlocher et al. | |
| 5,807,177 | A | 9/1998 | Takemoto et al. | |
| 5,810,665 | A | 9/1998 | Takemoto et al. | |
| 5,833,537 | A | 11/1998 | Barrie | |
| 5,848,932 | A | 12/1998 | Adams | |
| 5,855,515 | A | 1/1999 | Pease et al. | |
| 5,876,284 | A | 3/1999 | Acres et al. | |
| 5,882,259 | A | 3/1999 | Holmes, Jr. et al. | |
| 5,882,261 | A | 3/1999 | Adams | |
| 5,890,962 | A | 4/1999 | Takemoto | |
| 5,911,418 | A | 6/1999 | Adams | |
| 5,947,820 | A | 9/1999 | Morro et al. | |
| 5,951,397 | A | 9/1999 | Dickinson | |
| 5,988,638 | A | 11/1999 | Rodesch et al. | |
| 6,004,207 | A | 12/1999 | Wilson, Jr. et al. | |
| 6,027,115 | A | 2/2000 | Griswold et al. | |
| 6,033,307 | A | 3/2000 | Vancura | |
| 6,048,269 | A | 4/2000 | Burns et al. | |
| 6,050,895 | A | 4/2000 | Luciano, Jr. et al. | |
| 6,056,642 | A | 5/2000 | Bennett | |
| 6,089,976 | A | 7/2000 | Schneider et al. | |
| 6,089,977 | A | 7/2000 | Bennett | |
| 6,102,798 | A | 8/2000 | Bennett | |
| 6,120,031 | A | 9/2000 | Adams | |
| 6,142,873 | A | 11/2000 | Weiss et al. | |
| 6,159,097 | A | 12/2000 | Gura | |
| 6,162,121 | A | 12/2000 | Morro et al. | |
| 6,168,520 | B1 | 1/2001 | Baerlocher et al. | |
| 6,186,894 | B1 | 2/2001 | Mayeroff | |
| 6,203,429 | B1 | 3/2001 | Demar et al. | |
| 6,213,875 | B1 | 4/2001 | Suzuki | |
| 6,224,482 | B1 | 5/2001 | Bennett | |
| 6,224,483 | B1 | 5/2001 | Mayeroff | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,270,411 | B1 | 8/2001 | Gura et al. | |
| 6,270,412 | B1 | 8/2001 | Crawford et al. | |
| 6,290,600 | B1 | 9/2001 | Glasson | |
| 6,309,300 | B1 | 10/2001 | Glavich | |
| 6,319,124 | B1 | 11/2001 | Baerlocher et al. | |
| 6,346,043 | B1 | 2/2002 | Colin et al. | |
| 6,364,766 | B1 | 4/2002 | Anderson et al. | |
| 6,375,567 | B1 | 4/2002 | Acres | |
| 6,375,570 | B1 | 4/2002 | Poole | |
| 6,413,162 | B1 | 7/2002 | Baerlocher et al. | |
| 6,481,713 | B2 | 11/2002 | Perrie et al. | |
| 6,511,068 | B1 * | 1/2003 | Sklansky | A63F 3/00157 273/237 |
| 6,517,432 | B1 | 2/2003 | Jaffe | |
| 6,537,150 | B1 | 3/2003 | Luciano et al. | |
| 6,544,120 | B2 | 4/2003 | Ainsworth | |
| 6,547,242 | B1 | 4/2003 | Sugiyama et al. | |
| 6,551,187 | B1 | 4/2003 | Jaffe | |
| 6,554,704 | B2 | 4/2003 | Nicastro et al. | |
| 6,558,254 | B2 | 5/2003 | Baelocher et al. | |
| 6,561,900 | B1 | 5/2003 | Baerlocher et al. | |
| 6,561,904 | B2 | 5/2003 | Locke et al. | |
| 6,565,434 | B1 | 5/2003 | Acres | |
| 6,641,477 | B1 | 11/2003 | Dietz | |
| 6,652,378 | B2 | 11/2003 | Cannon et al. | |
| 6,656,040 | B1 | 12/2003 | Brosnan et al. | |
| 6,657,923 | B2 | 12/2003 | Laughlin | |
| 6,692,356 | B2 | 2/2004 | Baerlocher et al. | |
| 6,702,675 | B2 | 3/2004 | Poole et al. | |
| 6,731,313 | B1 | 5/2004 | Kaminkow | |
| 6,749,502 | B2 | 6/2004 | Baerlocher | |
| 6,786,818 | B1 | 9/2004 | Rothschild et al. | |
| 6,832,957 | B2 | 12/2004 | Falconer | |
| 6,837,790 | B1 | 1/2005 | Kaminkow | |
| 6,855,053 | B2 | 2/2005 | Baerlocher | |
| 6,869,360 | B2 | 3/2005 | Marks et al. | |
| 6,878,061 | B2 | 4/2005 | Baerlocher et al. | |
| 6,896,617 | B2 | 5/2005 | Daly | |
| 6,910,962 | B2 | 6/2005 | Marks et al. | |
| 6,916,243 | B2 | 7/2005 | Yoshida | |
| 6,918,834 | B2 | 7/2005 | Vancura | |
| 6,921,334 | B1 | 7/2005 | Bennett | |
| 6,926,609 | B2 | 8/2005 | Martin | |
| 6,960,134 | B2 | 11/2005 | Hartl et al. | |
| 6,964,416 | B2 | 11/2005 | Mcclintic et al. | |
| 7,018,293 | B2 | 3/2006 | Brown et al. | |
| 7,029,395 | B1 | 4/2006 | Baerlocher | |
| 7,029,396 | B2 | 4/2006 | Jaffe et al. | |
| 7,065,215 | B2 | 6/2006 | Shirakawa et al. | |
| 7,112,136 | B2 | 9/2006 | Anderson et al. | |
| 7,121,945 | B2 | 10/2006 | Suganuma et al. | |
| 7,137,886 | B2 | 11/2006 | Locke et al. | |
| 7,147,559 | B2 | 12/2006 | Englman | |
| 7,156,740 | B2 | 1/2007 | Kaminkow | |
| 7,179,169 | B2 | 2/2007 | Beaulieu et al. | |
| 7,252,591 | B2 | 8/2007 | Van Asdale | |
| 7,294,055 | B2 | 11/2007 | Baerlocher et al. | |
| 7,316,613 | B2 | 1/2008 | Luccesi et al. | |
| 7,371,170 | B2 | 5/2008 | Cregan et al. | |
| 7,377,850 | B2 | 5/2008 | Shackelford et al. | |
| 7,431,646 | B2 | 10/2008 | Jackson | |
| 7,452,276 | B2 | 11/2008 | Loose et al. | |
| 7,458,890 | B2 | 12/2008 | Loose et al. | |
| 7,488,252 | B2 | 2/2009 | Griswold et al. | |
| 7,494,412 | B2 | 2/2009 | Baerlocher | |
| 7,503,847 | B2 | 3/2009 | Baerlocher | |
| 7,526,736 | B2 | 4/2009 | Kaminkow et al. | |
| 7,553,231 | B2 | 6/2009 | Rodgers et al. | |
| 7,578,735 | B2 | 8/2009 | Frizzell et al. | |
| 7,601,062 | B2 | 10/2009 | Cole et al. | |
| 7,604,538 | B2 | 10/2009 | Pacey | |
| 7,618,319 | B2 | 11/2009 | Casey et al. | |
| 7,625,278 | B2 | 12/2009 | Paulsen et al. | |
| 7,628,690 | B2 | 12/2009 | Englman et al. | |
| 7,631,872 | B2 | 12/2009 | Roemer et al. | |
| 7,654,895 | B2 | 2/2010 | Pacey | |
| 7,654,899 | B2 | 2/2010 | Durham et al. | |
| 7,699,699 | B2 | 4/2010 | Gilliland et al. | |
| 7,704,141 | B1 | 4/2010 | Marks et al. | |
| 7,744,460 | B2 | 6/2010 | Walker et al. | |
| 7,785,191 | B2 | 8/2010 | Marks et al. | |
| 7,789,744 | B2 | 9/2010 | Fiden | |
| 7,841,934 | B2 | 11/2010 | Gauselmann | |
| 7,980,936 | B2 | 7/2011 | Mead | |
| 8,021,223 | B2 | 9/2011 | Rose | |
| 8,021,225 | B2 | 9/2011 | Okada | |
| 8,066,563 | B1 | 11/2011 | Schultz et al. | |
| 8,083,581 | B2 | 12/2011 | Marks et al. | |
| 8,105,145 | B2 | 1/2012 | Jaffe | |
| 8,105,151 | B2 | 1/2012 | Caputo et al. | |
| 8,113,940 | B2 | 2/2012 | Hornik | |
| 8,147,322 | B2 | 4/2012 | Walker et al. | |
| 8,162,740 | B2 | 4/2012 | Aoki | |
| 8,162,741 | B2 | 4/2012 | Wadleigh et al. | |
| 8,192,275 | B2 | 6/2012 | Aoki et al. | |
| 8,246,442 | B1 | 8/2012 | Barrie | |
| 8,272,938 | B2 | 9/2012 | Gilmore et al. | |
| 8,287,357 | B2 | 10/2012 | Evans | |
| 8,323,091 | B2 | 12/2012 | Frank et al. | |
| 8,357,041 | B1 | 1/2013 | Saunders | |
| 8,360,851 | B2 | 1/2013 | Aoki et al. | |
| 8,366,538 | B1 | 2/2013 | Saunders et al. | |
| 8,371,930 | B1 | 2/2013 | Saunders et al. | |
| 8,388,432 | B2 | 3/2013 | Mattice et al. | |
| 8,414,380 | B2 | 4/2013 | Saunders et al. | |

(56) References Cited

U.S. PATENT DOCUMENTS

| | | | |
|---|---|---|---|
| 8,465,358 | B2 | 6/2013 | Kemper |
| 8,480,473 | B2 | 7/2013 | Villejo et al. |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,011,233 | B2 | 4/2015 | Ryan |
| 9,098,847 | B2 | 8/2015 | Basallo et al. |
| 9,098,973 | B2 | 8/2015 | Basallo et al. |
| 9,147,321 | B2 | 9/2015 | Moody |
| 9,165,433 | B2 | 10/2015 | Caputo |
| 9,177,447 | B2 | 11/2015 | Zoltewicz et al. |
| 9,202,345 | B2 | 12/2015 | Zoltewicz et al. |
| 9,214,011 | B2 | 12/2015 | Wei et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,474,972 | B2 | 10/2016 | Lenger |
| 9,495,839 | B2 | 11/2016 | Aoki et al. |
| 9,595,157 | B2 | 3/2017 | Rasmussen et al. |
| 9,633,506 | B2 | 4/2017 | Basallo et al. |
| 9,704,342 | B2 | 7/2017 | Aoki et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,062,237 | B2 | 8/2018 | Devine et al. |
| 10,204,473 | B2 | 2/2019 | Lenger |
| 10,242,533 | B2 | 3/2019 | Okada et al. |
| 10,339,761 | B2 | 7/2019 | Olive |
| 10,366,575 | B2 | 7/2019 | Visser |
| 10,388,112 | B2 | 8/2019 | You et al. |
| 10,410,472 | B2 | 9/2019 | Moody |
| 10,417,877 | B2 | 9/2019 | Gomez et al. |
| 10,475,294 | B2 | 11/2019 | Gomez et al. |
| 10,497,203 | B2 | 12/2019 | Elmqvist |
| 10,672,220 | B2 | 6/2020 | Lenger |
| 10,706,664 | B2 | 7/2020 | Boese et al. |
| 10,726,676 | B2 | 7/2020 | You et al. |
| 10,769,888 | B2 | 9/2020 | You et al. |
| 10,839,648 | B2 | 11/2020 | Okada et al. |
| 10,957,161 | B2 | 3/2021 | Chesworth et al. |
| 11,017,638 | B2 | 5/2021 | Chesworth et al. |
| 2001/0021666 | A1 | 9/2001 | Yoshida et al. |
| 2002/0016200 | A1 | 2/2002 | Baerlocher et al. |
| 2002/0045474 | A1 | 4/2002 | Singer et al. |
| 2002/0119818 | A1 | 8/2002 | Savio et al. |
| 2002/0155881 | A1 | 10/2002 | Yoshida |
| 2002/0183105 | A1 | 12/2002 | Cannon et al. |
| 2003/0017865 | A1 | 1/2003 | Beaulieu et al. |
| 2003/0027619 | A1 | 2/2003 | Nicastro, Sr. |
| 2003/0035346 | A1 | 2/2003 | Laughlin |
| 2003/0050111 | A1* | 3/2003 | Saffari ................ G07F 17/3255 463/25 |
| 2003/0064782 | A1 | 4/2003 | Beaulieu et al. |
| 2003/0064801 | A1 | 4/2003 | Breckner et al. |
| 2003/0064802 | A1 | 4/2003 | Rodgers et al. |
| 2003/0069063 | A1 | 4/2003 | Bilyeu et al. |
| 2003/0130034 | A1 | 7/2003 | Suganuma et al. |
| 2003/0157980 | A1 | 8/2003 | Loose et al. |
| 2003/0216165 | A1 | 11/2003 | Singer et al. |
| 2003/0232638 | A1* | 12/2003 | Luciano, Jr. ............ G07F 17/32 463/19 |
| 2004/0012145 | A1 | 1/2004 | Inoue |
| 2004/0023714 | A1 | 2/2004 | Asdale |
| 2004/0043815 | A1 | 3/2004 | Kaminkow |
| 2004/0048646 | A1 | 3/2004 | Visocnik |
| 2004/0092315 | A1 | 5/2004 | Boyd et al. |
| 2004/0137982 | A1 | 7/2004 | Cuddy et al. |
| 2004/0171417 | A1 | 9/2004 | Beaulieu et al. |
| 2004/0198489 | A1 | 10/2004 | Kaminkow et al. |
| 2005/0054442 | A1 | 3/2005 | Anderson et al. |
| 2005/0056995 | A1* | 3/2005 | Tempest .................. G07F 17/34 463/20 |
| 2005/0130731 | A1 | 6/2005 | Englman et al. |
| 2005/0159208 | A1 | 7/2005 | Pacey |
| 2005/0277457 | A1* | 12/2005 | Wilson ................ G07F 17/3267 463/12 |
| 2006/0009286 | A1 | 1/2006 | Durham et al. |
| 2006/0063588 | A1 | 3/2006 | Poole |
| 2006/0111173 | A1 | 5/2006 | Yang |
| 2006/0142080 | A1 | 6/2006 | Enzminger |
| 2006/0189369 | A1 | 8/2006 | Taylor |
| 2006/0205469 | A1 | 9/2006 | Schultz et al. |
| 2006/0247002 | A1 | 11/2006 | Yoshimi et al. |
| 2007/0060248 | A1 | 3/2007 | Rodgers et al. |
| 2007/0060255 | A1 | 3/2007 | Baerlocher et al. |
| 2007/0060275 | A1 | 3/2007 | Gilmore et al. |
| 2007/0129135 | A1 | 6/2007 | Marks et al. |
| 2007/0149267 | A1 | 6/2007 | Ross et al. |
| 2007/0281784 | A1 | 12/2007 | Seelig et al. |
| 2007/0287529 | A1 | 12/2007 | Kojima |
| 2008/0003278 | A1 | 1/2008 | Mondelo |
| 2008/0004532 | A1 | 1/2008 | Rubey et al. |
| 2008/0026831 | A1* | 1/2008 | Wright ................ G07F 17/3281 463/26 |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108408 | A1 | 5/2008 | Wolf |
| 2008/0108411 | A1 | 5/2008 | Jensen et al. |
| 2008/0108422 | A1 | 5/2008 | Hedrick et al. |
| 2008/0108431 | A1 | 5/2008 | Cuddy et al. |
| 2008/0132321 | A1 | 6/2008 | Pau |
| 2008/0146346 | A1* | 6/2008 | Hardy ................... G07F 17/329 463/16 |
| 2008/0182647 | A1 | 7/2008 | Brunet De Courssou et al. |
| 2008/0242421 | A1* | 10/2008 | Geisner ................... A63F 13/75 463/42 |
| 2008/0274789 | A1 | 11/2008 | Singer et al. |
| 2009/0036208 | A1 | 2/2009 | Pennington et al. |
| 2009/0156287 | A1 | 6/2009 | Baumgartner |
| 2009/0181755 | A1 | 7/2009 | Gagner et al. |
| 2009/0239634 | A1 | 9/2009 | Nguyen |
| 2009/0291741 | A1 | 11/2009 | Schofield |
| 2010/0075737 | A1 | 3/2010 | Bluemel |
| 2010/0113133 | A1 | 5/2010 | Leupp |
| 2010/0167815 | A1 | 7/2010 | Gagner et al. |
| 2010/0203948 | A1 | 8/2010 | Falciglia, Sr. |
| 2010/0210343 | A1 | 8/2010 | Englman et al. |
| 2010/0234092 | A1 | 9/2010 | Gomez et al. |
| 2010/0304832 | A1 | 12/2010 | Kup-Ferroth |
| 2011/0244943 | A1 | 10/2011 | Milford et al. |
| 2011/0300937 | A1 | 12/2011 | Crowder, Jr. et al. |

(56) References Cited

U.S. PATENT DOCUMENTS

| | | | |
|---|---|---|---|
| 2012/0015707 | A1 | 1/2012 | Hornik et al. |
| 2012/0034965 | A1 | 2/2012 | Masen et al. |
| 2012/0064961 | A1 * | 3/2012 | Vancura .............. G07F 17/3265 463/20 |
| 2012/0077564 | A1 | 3/2012 | Collette et al. |
| 2012/0094738 | A1 | 4/2012 | Aoki et al. |
| 2012/0122532 | A1 | 5/2012 | Berman et al. |
| 2012/0178517 | A1 | 7/2012 | Montenegro et al. |
| 2012/0220360 | A1 | 8/2012 | Mcallister et al. |
| 2013/0053124 | A1 | 2/2013 | Masen et al. |
| 2013/0065663 | A1 | 3/2013 | Johnson et al. |
| 2013/0102375 | A1 | 4/2013 | Aoki et al. |
| 2013/0252704 | A1 | 9/2013 | Gilbertson et al. |
| 2013/0260861 | A1 | 10/2013 | Vann et al. |
| 2013/0324217 | A1 | 12/2013 | Gilbertson et al. |
| 2014/0014186 | A1 | 1/2014 | Bhattacharya et al. |
| 2014/0024429 | A1 | 1/2014 | Aoki et al. |
| 2014/0051496 | A1 | 2/2014 | Meyer |
| 2014/0141860 | A1 | 5/2014 | Meyer |
| 2014/0179396 | A1 | 6/2014 | Aoki et al. |
| 2014/0274292 | A1 | 9/2014 | Suda |
| 2014/0323198 | A1 | 10/2014 | Tuck |
| 2015/0031437 | A1 | 1/2015 | Gomez et al. |
| 2015/0072750 | A1 * | 3/2015 | Rinaldis .............. G07F 17/3258 463/19 |
| 2015/0170462 | A1 | 6/2015 | Berman et al. |
| 2015/0206386 | A1 | 7/2015 | Jaffe et al. |
| 2015/0269809 | A1 | 9/2015 | Smith |
| 2015/0287269 | A1 | 10/2015 | Berman |
| 2015/0356833 | A1 | 12/2015 | Aoki et al. |
| 2015/0379831 | A1 | 12/2015 | Lee et al. |
| 2016/0042597 | A1 | 2/2016 | Olive |
| 2016/0063799 | A1 * | 3/2016 | Reeves ................. G07F 17/326 463/17 |
| 2016/0155303 | A1 | 6/2016 | Aoki et al. |
| 2016/0358424 | A1 * | 12/2016 | Thomas .............. G07F 17/3272 |
| 2017/0154498 | A1 | 6/2017 | Olive |
| 2017/0372558 | A1 | 12/2017 | You et al. |
| 2018/0130303 | A1 | 5/2018 | Lamb |
| 2018/0268655 | A1 | 9/2018 | Olive |
| 2018/0268659 | A1 | 9/2018 | Chesworth et al. |
| 2019/0051097 | A1 | 2/2019 | Marks et al. |
| 2019/0102992 | A1 | 4/2019 | You et al. |
| 2019/0236905 | A1 | 8/2019 | Washington et al. |
| 2021/0110665 | A1 * | 4/2021 | Kendall .................. G07F 17/34 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

* cited by examiner

FIG. 6
600
MEGA
$25,000.08
GRAND
$2,500.15
MAJOR
$125.00
MAXI
$75.00
MINOR
$50.00
MINI
$25.00
610
620

GAMING SYSTEM AND METHOD WITH A PERSISTENT ELEMENT FEATURE INCLUDING A SLIDING RANGE COMPONENT

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to technological improvements in connection with a persistent element feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

There are provided a gaming machine and method that utilize game-logic circuitry and a presentation assembly configured to present a plurality of symbol-bearing base reels, a base array, and a plurality of persistent elements. The plurality of base reels are spun and stopped to land symbols from the base reels in the base array. In response to the landed symbols including at least one accumulation symbol, an animation of addition of the accumulation symbol to one of the plurality of persistent elements is presented. A random determination whether or not to trigger one or more game features is made. If the determination is to trigger the one or more game features, the one or more game features are implemented via the game-logic circuitry and the presentation assembly, wherein the implementation may be determined by a persistent sliding range component associated with at least one of the game features.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A relates to a base-game portion of a wagering game; FIG. 3B relates to the awarding of one or more game features and a bonus game that may be triggered as a result of the awarding of the game features.

Figure 1:
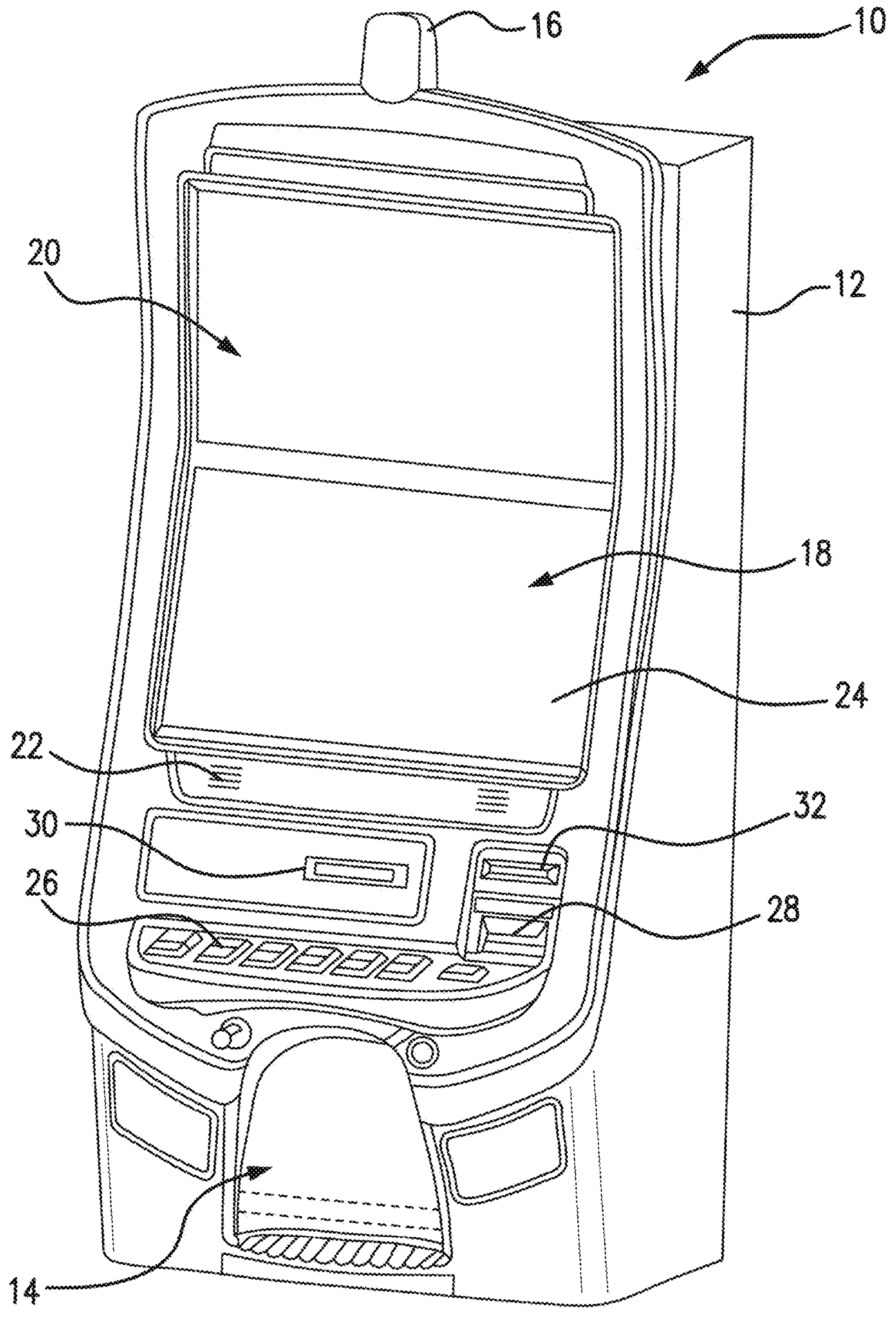
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
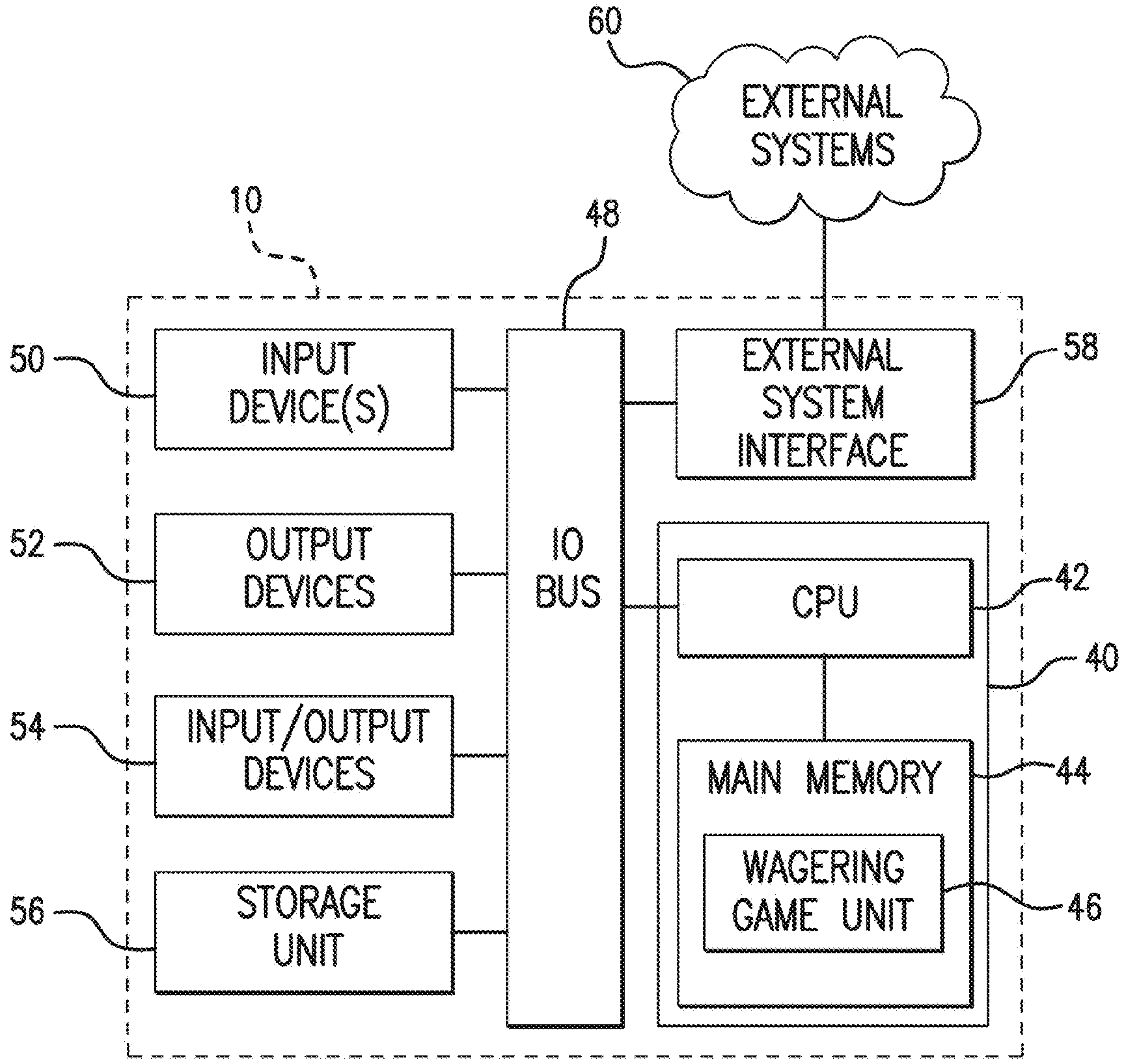
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
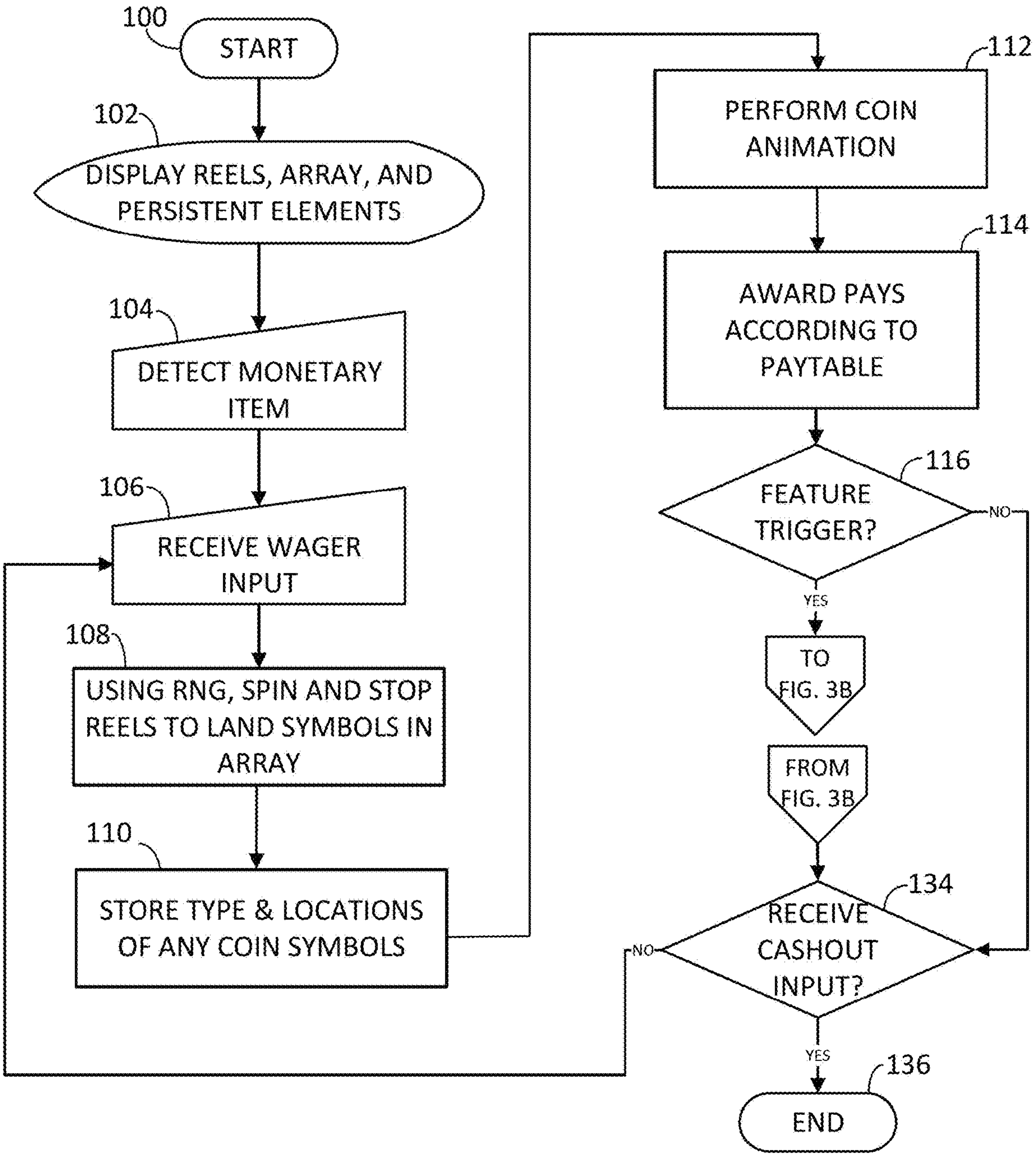
FIGS. 3A and 3B are a flow diagram for a data processing method that corresponds to instructions executed by a controller, according to an embodiment of the present invention.
Figure 3B:
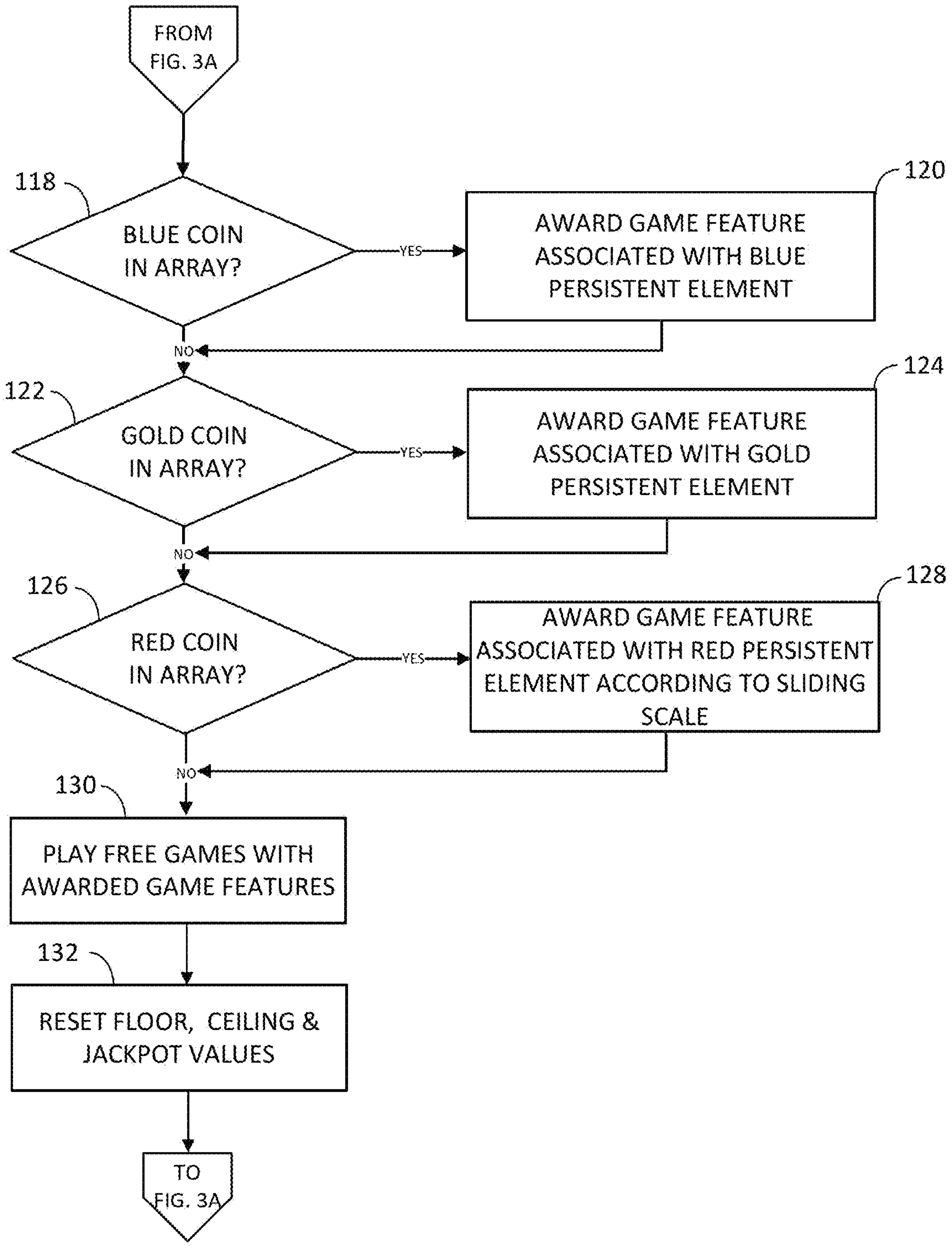

Referring now to FIGS. 3A-3B, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of two different spin outcomes in FIGS. 4 and 5.

Game Play Initiation

Referring to FIG. 3A, the data processing method commences at step 100. At step 102, the game-logic circuitry controls one or more presentation devices (e.g., mechanical-reel display device, video display device, or a combination thereof) to present a plurality of symbol-bearing reels, an array of symbol positions, and a plurality of persistent elements. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game and any bonus games utilizing the array.

Figure 4:
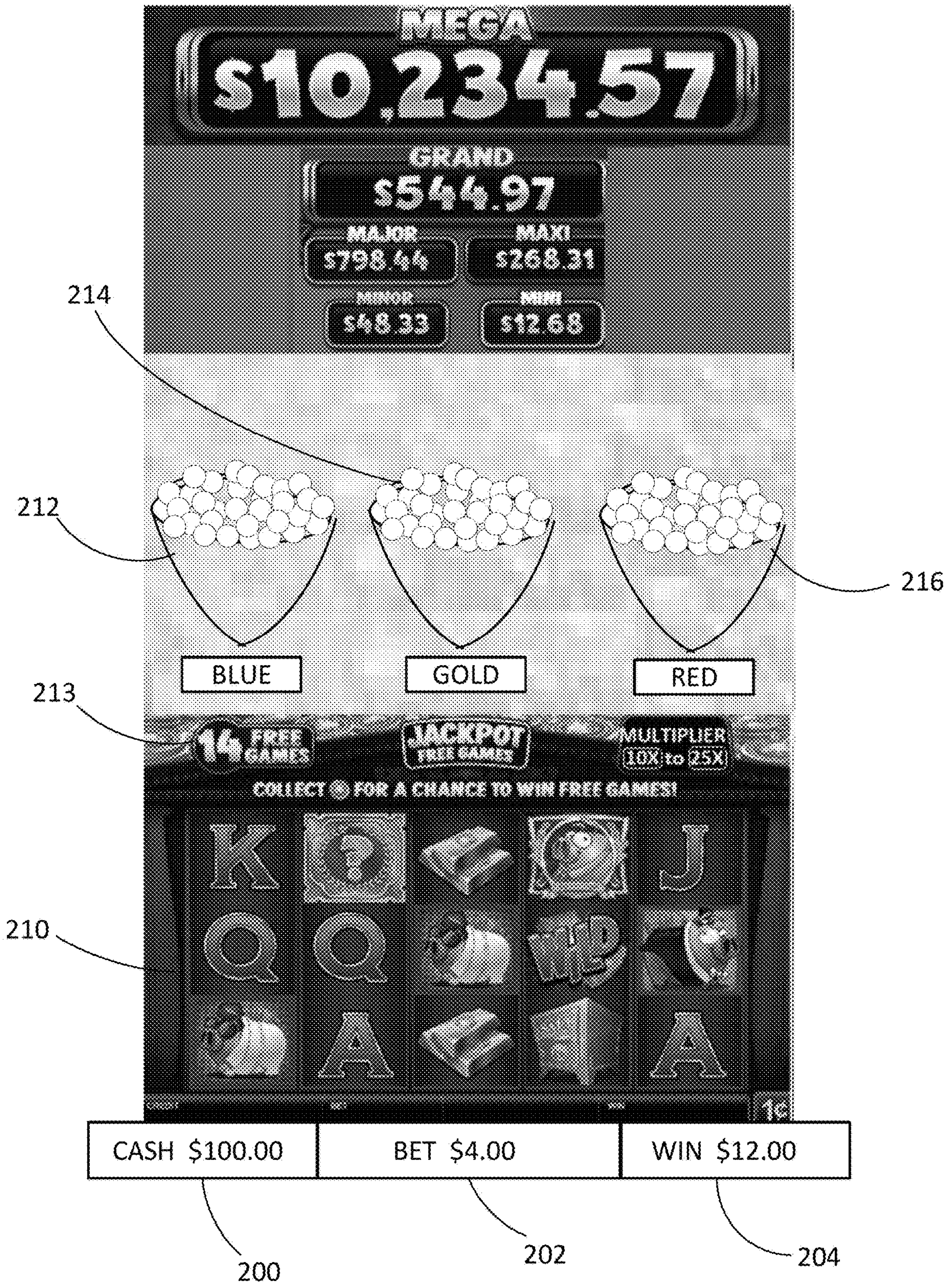
FIGS. 4 and 5 are exemplary presentations of base-game spin outcomes resulting from the flow diagram in FIG. 3A.
Figure 5:
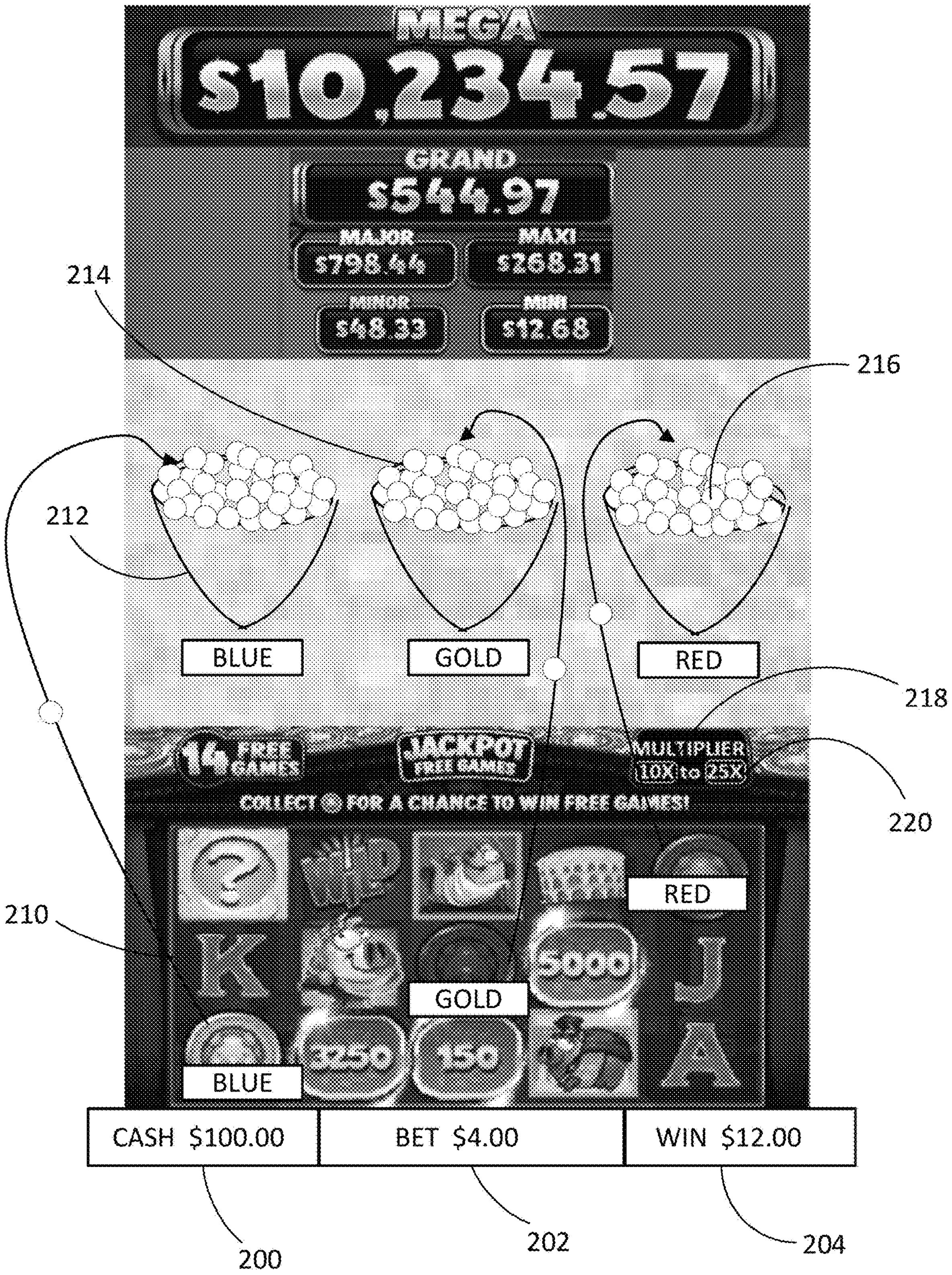

Referring to FIGS. 4-5, which illustrates examples of the display at the conclusion of a first and a second representative base game spin, respectively, the symbol array 210 in the base game has a three-by-five rectangular configuration, and each symbol position is associated with a respective independent reel. The reels bear a plurality of symbols that may, for example, include various base game symbols and a WILD symbol that can substitute for any of the base game symbols. Though not shown in FIG. 4, FIG. 5 illustrates that the plurality of symbols may also include accumulation symbols in the form of BLUE, GOLD and RED coin symbols. Players hope to land the BLUE, GOLD or RED coin symbols in the symbol array 210 in order to win a free games bonus game according to rules associated with three persistent elements 212, 214, 216. In the examples of FIGS. 4-5, a BLUE COIN is associated with the first persistent element 212, a GOLD coin is associated with the second persistent element 214, and a RED coin is associated with the third persistent element 216. In the examples of FIGS. 4-5, a "Free Games" game feature is associated with the first persistent element 212, a "Jackpot Free Games" game feature is associated with the second persistent element 214, and a "Multiplier" game feature is associated with the third persistent element 216. These game features are of various types, which will be described further below.

In FIGS. 4-5, the persistent elements are represented as coin pots. The persistent elements may take forms other than the coin pots 212, 214, 216, including for example urns, vases, jars, jugs, cans, bowls, piggy banks, beehives, inflating balloons, ladders, dials, meters, etc. Similarly, the accumulation symbols associated with the persistent elements may take forms other than coins, including, for example, balloons, colored dollar signs, etc. The accumulation symbols may or may not be color-matched to their respective persistent elements, provided their association to a persistent element is indicated. For example, the BLUE coins and the first persistent element 212 may be colored blue, the GOLD coins and the second persistent element 214 may be colored gold, and the RED coins and the third persistent element 216 may be colored red.

At step 104, the game-logic circuitry detects, via a value input device, a physical item associated with a monetary value that establishes a monetary balance in the form of cash or credits. In FIGS. 4-5, the monetary balance may be shown on a meter 200. Values such as jackpot values and floor and ceiling attributes of persistent sliding scale components, discussed below, may be initialized to predetermined values or may carry over from a previous playing session.

Base Game Spin

At step 106, the game-logic circuitry initiates a base game of a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4-5 the wager may be shown on a bet meter 202.

At step 108, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIG. 4 depicts a first base-game spin outcome.

Animation of Persistent Element Growth

At step 110, the game-logic circuitry determines whether or not any accumulation (coin) symbols landed in the array and, if so, stores the which coins, BLUE, GOLD, or RED, and their locations for future use at steps 116, 118, 122 and 126.

FIG. 5 illustrates the results of a second base game spin in which coins have landed in the array. At step 112, the game-logic circuitry animates, via the one or more presentation devices, an addition of any coin in the array to the persistent element associated with the coin. To show the transfer of a coin symbol to a persistent element, the coin may be animated to "fly" from the array to land in its associated persistent element. To represent the gradual addition of coins to the persistent element, the persistent element and/or the volume of coins therein may appear to grow in size. In accordance with some embodiments, the persistent element may be an object of fixed size accompanied by some other indication of accumulating value, for example, by a gradual change in color shading, for example, from light red to dark red. In other embodiments, the persistent element may change size and also show some other indication of increasing value, for example, the color of the display in the immediate area of the persistent element may gradually change as its value increases. The size of a persistent element may or may not indicate the likelihood that its associated game feature will be triggered. This will be discussed further below.

In one or more embodiments, the coin symbols may be carried on the reels as "stickers" applied over an underlying standard reel symbol. As part of the animation sequence at step 112, in which the coin is transferred to its respective persistent element, the coin "sticker" is removed from its location in the reel array to reveal the standard reel symbol underneath. In other embodiments, the coin symbols may simply be removed from the array and replacement symbols may be randomly selected to take their places. As mentioned above, value-bearing coin symbols may remain in the array and contribute their values to the game's outcome. In other embodiments, non-value-bearing coin symbols may remain in the array as "blocking symbols" that break up other potentially winning combinations of standard symbols.

These approaches or combinations thereof all fall within the spirit and scope of the invention.

In FIG. 5, each transfer of a coin to the persistent elements 212, 214, 216 is represented by a "coin" circle and an arrow. See, for example, the arrow from the BLUE coin in the first column of the array 210, the arrow from the GOLD coin in the second column of the array 210, and the arrow from the RED coin in the fifth column of the array 210 in FIG. 5. Though not shown in FIG. 5, no coins, a coin of only one or two colors or multiple coins of the same color/type may appear in the array at the same time. Animation representing the transfer each coin from the array 210 to its respective persistent element may be presented sequentially or in parallel.

Base Game Win Evaluation

Once any animation of persistent element growth has occurred, the game-logic circuitry evaluates the symbols in the array, including any revealed or replaced symbols in positions previously occupied by coins, at step 114. Payouts are awarded in accordance with a pay table. The pay table may, for example, include "line pays," "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 4, for example, depicts a line pay of three Q symbols in the middle row of the array 210. The awarded pay is added to a win meter 204. FIG. 5 does not illustrate any base game pays, but, instead, is intended to illustrate outcomes related to various attributes of the persistent elements 212-216.

Game Feature Triggering

At step 116, if a location of at least one coin symbol was stored at step 110, the game-logic circuitry randomly determines, via the RNG, whether or not to trigger the game features associated with the coins stored at step 110. This random determination is independent of any prior wagering game cycles. In accordance with one or more embodiments, if any coin symbols appear in the array, the odds of triggering the game features in steps 118-132 may increase according to the number of coins appearing in the array. This may be accomplished, for example, by changing weights associated with the random determination. In other embodiments, the appearance of multiple coins in the array has no effect on the probability of awarding the game features associated with the persistent elements corresponding to the coins appearing in the array. If the game features are triggered, for each coin symbol detected at step 110, an indication such as a "WINNER!" label may appear next to each respective coin's associated persistent element or the respective persistent element may be otherwise highlighted. Persistent elements associated with non-triggered game features may be further deemphasized, for example, by shading or "greying" them out.

If a game feature is not triggered at step 116, the base game spin cycle is complete, and the game-logic circuitry proceeds to step 134. If, however, at least one game feature was triggered at step 116, the game-logic circuitry instead proceeds to the flow in FIG. 3B, where one or more game features are awarded.

In some embodiments, a game feature simply awards a prize, for example a fixed or progressive jackpot amount. In some embodiments, a game feature may comprise any type of bonus game. Non-limiting examples of bonus games include a certain number of free games (i.e., spins of the reels), a "pick' em" bonus game, a wheel-spinning game, etc. In embodiments offering a free spin bonus game, the free spins may be played as a "hold and spin" game in which certain types of symbols, once landed in the array, are held in place and persist in the array for at least one additional free spin cycle. These persistent symbols may include value-bearing ("WYSIWYG") symbols, wild symbols or other symbols that may improve the chances of winning or provide higher pays. In still other embodiments, a bonus game may be played to determine payment of prize, for example, a fixed or progressive jackpot. In some embodiments, a game feature may comprise an enhancement to the game. An enhancement may include, without limitation, pay table modifiers such as multipliers, increased values on value-bearing symbols, modification to the reels to include improved symbols, such as wild symbols or symbol weights or the removal of certain "blocking symbols", additional rows or columns added to the array, additional free spins, replacement symbols for symbols already present in the array, etc. The enhancement may be applied to the current base game outcome or may be applied to one or more subsequent bonus games or wagered base game plays. In some embodiments, a game feature may provide a second plurality of symbol-bearing reels and a second array of symbol positions to be filled, as described above, for a certain number of game cycles. Each game feature has a different impact on the expected value (EV) of the game. The relative frequency of the game features may be controlled by adjusting which coin pot they are associated with in the cascade sequence, for example. Thus, a less lucrative game feature may be won more frequently, for example, approximately once in every ten game spin cycles, while a higher paying game feature may only occur approximately once in every one hundred game spin cycles according to a weighted cascade value determination. This allows game features to be triggered more often, for player enjoyment, while maintaining the overall expected EV of the wagering game.

Perceived Persistence

During a player's gaming session, the growth in size of the persistent elements 212, 214 and 216 persists from one wagering game cycle to the next such that the player perceives that a game feature corresponding to a persistent element may be getting closer to being triggered. When the size of the persistent elements has no bearing on whether the associated game feature will actually be triggered, this is known as "perceived persistence." When a game feature associated with a persistent element is triggered, at least some of the contents of the persistent element are visually removed and the accumulation of value in that persistent element during subsequent game spin cycles resumes from that point. Each of the persistent elements 212, 214 and 216 in FIGS. 4 and 5 exhibit perceived persistence.

At step 118, if at least one BLUE coin associated with the first persistent element 212 was stored as present in the array at step 110, the game logic circuitry awards the game feature associated with the first persistent element 212 at step 120, otherwise the game-logic circuitry continues the flow at step 122.

In the example shown in FIG. 5, the game feature associated with the first persistent element 212 is "Free Games." Thus, the game feature associated with the first persistent element 212 is a number of free games or spins, for example, 14 free games, as shown in a free games meter 213 associated with the first persistent element 212. Awarding the "Free Games" game feature at step 120 results in 14 free games to be played, once any other game features have been awarded, at step 130.

Once the "Free Games" game feature has been awarded at step 120, the game logic circuitry proceeds to step 122.

At step 122, if at least one GOLD coin associated with the second persistent element 214 was stored as present in the array at step 110, the game logic circuitry awards the game feature associated with the second persistent element 214 at step 124, otherwise the game-logic circuitry continues the flow at step 126.

In the example shown, the game feature associated with the second persistent element 214 is "Jackpot Free Games," in which the values on value-bearing symbols on the reel strips may be at least partially replaced by jackpot labels during a specified number of free games, for example, seven free games. Rather than bearing a specific amount, a MEGA, GRAND, MAJOR, MAXI, MINOR, or MINI award label, representing a Mega Progressive, a Grand Progressive, a Major Jackpot, a Maxi Jackpot, a Minor Jackpot, or a Mini Jackpot, may be indicated on some of the value-bearing symbols. The reel strip layouts may otherwise remain the same as those of the base game or may be different.

Figure 6:
FIG. 6 is an exemplary presentations of a jackpot prize board in accordance with one or more embodiments.

During the free games, played below at step 130, each landed jackpot symbol is collected in a collection meter that, once filled, awards that jackpot. See, for example, FIG. 6, which illustrates a prize board 600 of jackpot value meters and collection meters, one for each of the above-mentioned jackpots. In FIG. 6, the value meter and collection meter for the Minor Jackpot are identified as elements 610 and 620, respectively, with the understanding that the other jackpots displayed on the jackpot prize board 600 include like meter elements.

As with coin symbols, the jackpot symbols may be "stickers" that "fly" out of the array 210 to be collected in their respective collection meters, revealing another symbol in the array 210 beneath the now-missing jackpot symbol. In some embodiments, the jackpot symbols may be removed and replaced by randomly determined replacement symbols or may remain in the array, as described above, as "blocking symbols." Each of these approaches, singly or in combination, falls within the spirit and scope of the invention.

Combined Perceived Persistence/True Persistence

It has been explained that the second persistent element 114 exhibits perceived persistence. However, when game features are not triggered at step 116, each GOLD coin symbol stored as appearing in the array at step 110 may (or may not) add additional value to the Major, Maxi, Minor, or Mini value meter for the jackpot to which it "flies." This leads to increased suspense every time a GOLD coin symbol appears in the array. Because the increased values in the value meters persist in the base game from spin to spin until the "Jackpot Free Games" game feature is triggered, the expected value (EV) of the "Jackpot Free Games" game feature increases over time. This persistence aspect is known as "true persistence." This attribute makes it even less likely that a player will leave the game until the game feature is awarded. Thus, the second persistence element 214 exhibits both perceived persistence (that the game feature will be awarded) and true persistence (that the game feature will pay more the longer it takes for it to be triggered). When won during play of the free games (step 130, below) or at the end of the free games (step 132, below), if not won, the Major Jackpot, Maxi Jackpot, Minor Jackpot, and Mini Jackpot meters are reset to initial values.

Once the game feature has been awarded at step 124, the game logic circuitry proceeds to step 126.

At step 126, if at least one RED coin associated with the third persistent element 216 was stored as present in the array at step 110, the game logic circuitry awards the game feature associated with the third persistent element 216 at step 128, otherwise the game-logic circuitry continues the flow at step 130.

Combined Perceived Persistence/True Persistence with a Sliding Range

In the example shown, the game feature associated with the third persistent element 216 is a "Multiplier" game feature, in which wild symbols on the reel strips may receive a multiplier for use during a specified number of free games, for example, seven free games.

In addition to exhibiting both perceived persistence and true persistence, as described above, the third persistent element 216 introduces a sliding range component to the true persistence element of its game feature. The value of each multiplier applied to a wild symbol is randomly determined based on a floor attribute displayed by a floor meter 218 and a ceiling attribute displayed by a ceiling meter 220. In the example of FIG. 5, the value of the floor meter 218 is 10× and the value of the ceiling meter 220 is 25×. Each wild multiplier assigned to a wild symbol will, thus, be between 10× and 25×, for example, 10×, 20× or 25×. The reel strip layouts may otherwise remain the same as those of the base game or may be different. From a game excitement standpoint, use of a sliding range gives variety and the ability for the player feel as though they occasionally "beat the game" when the top of the range is randomly selected for a wild multiplier and that wild symbol appears in a winning combination. It also allows the game designer to advertise a higher "top end" then could be offered using a single persistent wild multiplier value that merely increments from, for example, 10× to 15× to 20×.

As with the true persistence element of the second persistent element 214, when game features are not triggered at step 116, each RED coin symbol stored as appearing in the array at step 110 may (or may not) add additional value to the floor and ceiling meters. For example, on a given base game spin, the floor attribute and floor meter 218 may increase to 15× and the ceiling attribute and ceiling 220 meter may increase to 35×. In a later game cycle, the floor attribute and floor meter 218 may increase from 15× to 25× and the ceiling attribute and ceiling meter 220 may increase from 35× to 50×. The increased floor and ceiling values in the floor meter 218 and the ceiling meter 220 persist in the base game from spin to spin until the "Multiplier" game feature is triggered, as which time wild multiplier values between the floor and ceiling values are applied to wild symbols prior to initiating the free games.

Once the game feature has been awarded at step 128, the game logic circuitry proceeds to step 130.

Playing the Free Games

At step 130, once all of the game features have been awarded at one or more of steps 120, 124 and 128, the free games are played. The game-logic circuitry may control one or more presentation devices (e.g., mechanical-reel display device, video display device, or a combination thereof) to present a free games array and number of reel spins to populate the array with symbols to be evaluated according to a pay table and any of the other game features won from the persistent elements. The free games array may have the same configuration as the base game array or may have a different configuration than the base game array. For example, if only the "Free Games" game feature have been awarded, fourteen free games will be played. If only the "Jackpot Free Games" feature has been awarded, seven free games will be played, but according to the "Jackpot Free Games" rules described above. If only the "Multiplier" game feature has been awarded, seven free games will be played with wild symbol multipliers assigned as described above. However, the free games will combine each of the awarded game features, further enhancing the excitement and EV of the free games. In the most extreme case, where all three game features have been awarded, fourteen "Jackpot Free Games" will be played with "Multiplier" wild symbols.

At step 132, with the play of the free games completed, the floor attribute and floor meter 218 and the ceiling attribute and ceiling meter 220 are reset to predetermined reset values, for example, 10× and 25×, respectively. As mentioned above, all jackpot meters not won during the bonus game are also reset to predetermined reset values. The flow then returns to FIG. 3A.

Game Play Termination

At step 134, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the meter 200 in FIGS. 4-5. The data processing method then ends at step 136.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the game feature triggering process, if no coin symbol appears in the array at step 110, the game-logic circuitry foregoes any random determination of whether a game feature will be awarded. Furthermore, if any coin symbols do appear in the array, regardless of the number of pots and associated game features that may be won in parallel, only a single invocation of the RNG at step 116 is required to determine whether any game feature will actually be triggered. In contrast, in typical prior art systems with mystery bonus triggers, the game-logic circuitry makes a random determination in each and every wagering game cycle and for each and every game feature that may be won, thereby reducing processing efficiency compared to the method presented herein. Furthermore, use of a sliding range from which values are randomly selected provides multiple outcome paths with only one additional RNG call, rather than predefining an exhaustive list of possible scenarios in configuration files, memory, etc.

In this description, numerous specific details are set forth. However, it is understood that embodiments of the invention may be practiced without these specific details. For example, the displayed size of a perceived persistence/true persistence persistent element may partially represent the likelihood that its associated game feature will be triggered.

In another example, in one or more embodiments, the reels may include value-bearing symbols, otherwise known as WYSIWYG ("What You See is What You Get") or "cash on reels" symbols. Each value-bearing symbol is associated with a credit or currency value indicated on the symbol itself. The value on a particular credit-bearing symbol may be variable (e.g., random) from one game cycle to the next. Different value-bearing symbols on the reels may have different values. In a variation of the combined perceived persistence/true persistence with a sliding range component, for example, element 216 described above, the persistent floor meter 218 and ceiling meter 220 may be applied to the determination of the values borne by value-bearing symbols on the reels during the free games instead of to wild multipliers. As an example, the floor meter 218 may initially be set to 100 and the ceiling meter 220 may be set to 500. Values assigned to the value bearing symbols would, thus, initially fall between 100 and 500. Over time, as the floor meter 218 and the ceiling meter 220 gradually increase, so too will the values to be assigned to the value-bearing symbols when the game feature is actually awarded. This leads to higher expected EV and player excitement, encouraging the player to play longer. Once the game feature was awarded and the free games played, the floor meter 218 and the ceiling meter 220 would be reset to their initial values.

Some embodiments of the present invention comprise an innovative application of data processing steps that, when implemented by game-logic circuitry, direct a presentation assembly to present a symbol-value collection, selection, and award process that minimizes processing overhead by utilizing numbered indicia to represent credit values instead of complex, fanciful game images. In this way, the value-bearing symbols require fewer rules needed for the award process than would be necessary for calculating values of winning symbol combinations enumerated in stored pay-tables, as found in more complex reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

conducting, by game-logic circuitry, a base game responsive to a game initiation input, the base game including:

presenting, by a presentation assembly, a plurality of symbol-bearing base reels, a base array, and a plurality of persistent elements, each persistent element having an associated game feature and an associated accumulation symbol;

spinning and stopping the plurality of symbol-bearing base reels to land symbols from the base reels in the base array; and in response to the landed symbols including at least one accumulation symbol: animating, by the presentation assembly, an addition of the at least one accumulation symbol to its associated persistent element; and randomly determining, by the game-logic circuitry using a random number generator, whether or not to award the game feature associated with the persistent element associated with the at least one accumulation symbol; and in response to awarding the game feature associated with the persistent element associated with the at least one accumulation symbol, implementing, by the game-logic circuitry, the game feature, wherein the implementing comprises: dynamically adjusting, by the game-logic circuitry in response to game outcomes over a plurality of base game plays, a data structure in a memory that stores a floor value and a ceiling value for a persistent sliding range component of the game feature, the data structure being maintained in the memory between the plurality of base game plays; and application, by the game-logic circuitry, of a randomly determined variable attribute derived from the floor value and the ceiling value stored in the maintained data structure.

2. The method of claim 1, further comprising:

if the awarded game features include a mix of a bonus game and non-bonus-game features, presenting, by the presentation assembly, the bonus game modified by each awarded non-bonus-game feature, otherwise, presenting, by the presentation assembly, the base game modified by each awarded non-bonus game feature.

3. The method of claim 1, wherein the gaming machine is regulatorily approved and primarily dedicated to playing a wagering game.

4. The method of claim 1, wherein the current values are reset to predetermined values after implementing the awarded game feature.

5. The method of claim 1, wherein, in response to not awarding the game feature associated with the persistent element associated with the at least one accumulation symbol, increasing the current value of at least one of the floor attribute, the ceiling attribute, or both.

6. The method of claim 1, wherein the application of the randomly determined variable attribute comprises assignment of the randomly determined variable attribute to a value-bearing symbol.

7. The method of claim 1, wherein the application of the randomly determined variable attribute comprises assignment of the randomly determined variable attribute to a multiplier.

8. The method of claim 7, wherein the multiplier is assigned to a wild symbol.

9. The method of claim 1, wherein the animating operation includes increasing a size of the persistent element or a volume of items therein.

10. The method of claim 9, wherein randomly determining whether or not to award the game features associated with the persistent elements is, at least in part, based on the size of the persistent element or the volume of items therein.

11. A gaming machine comprising:

a presentation assembly;

one or more electronic input devices configured to receive a game initiation input; and game-logic circuitry including a processor and a memory, the game-logic circuitry configured to perform the operations of:

conducting, responsive to the game initiation input, a base game including:

presenting, by the presentation assembly, a plurality of symbol-bearing base reels, a base array, and a plurality of persistent elements, each persistent element having an associated game feature and an associated accumulation symbol;

spinning and stopping the plurality of symbol-bearing base reels to land symbols from the base reels in the base array; and in response to the landed symbols including at least one accumulation symbol:

animating, by the presentation assembly, an addition of the at least one accumulation symbol to its associated persistent element; randomly determining, using a random number generator, whether or not to award the game feature associated with the persistent element associated with the at least one accumulation symbol; and in response to awarding the game feature associated with the persistent element associated with the at least one accumulation symbol, implementing the game feature wherein the implementing comprises: dynamically adjusting, in response to game outcomes over a plurality of base game plays, a data structure in the memory that stores a floor value and a ceiling value for a persistent sliding range component of the game feature, the data structure being maintained in the memory between the plurality of base game plays; and application of a randomly determined variable attribute derived from the floor value and the ceiling value stored in the maintained data structure.

12. The gaming machine of claim 11, wherein the game-logic circuitry is further configured to perform the operations of:

if the awarded game features include a mix of a bonus game and non-bonus-game features, presenting, by the presentation assembly, the bonus game modified by each awarded non-bonus-game feature, otherwise, presenting, by the presentation assembly, the base game modified by each awarded non-bonus game feature.

13. The gaming machine of claim 11, wherein the gaming machine is regulatorily approved and primarily dedicated to playing a wagering game.

14. The gaming machine of claim 11, wherein the current values are reset to predetermined values after implementing the awarded game feature.

15. The gaming machine of claim 11, wherein the game-logic circuitry is further configured to perform the operation of, in response to not awarding the game feature associated with the persistent element associated with the at least one accumulation symbol, increasing the current value of at least one of the floor attribute, the ceiling attribute, or both.

16. The gaming machine of claim 11, wherein the application of the randomly determined variable attribute comprises assignment of the randomly determined variable attribute to a value-bearing symbol.

17. The gaming machine of claim 11, wherein the application of the randomly determined variable attribute comprises assignment of the randomly determined variable attribute to a multiplier.

18. The gaming machine of claim 17, wherein the multiplier is assigned to a wild symbol.

19. The gaming machine of claim 11, wherein the animating operation includes increasing a size of the persistent element or a volume of items therein.

20. The gaming machine of claim 19, wherein randomly determining whether or not to award the game features associated with the persistent elements is, at least in part, based on the size of the persistent element or the volume of items therein.

* * * * *